Figure 1:
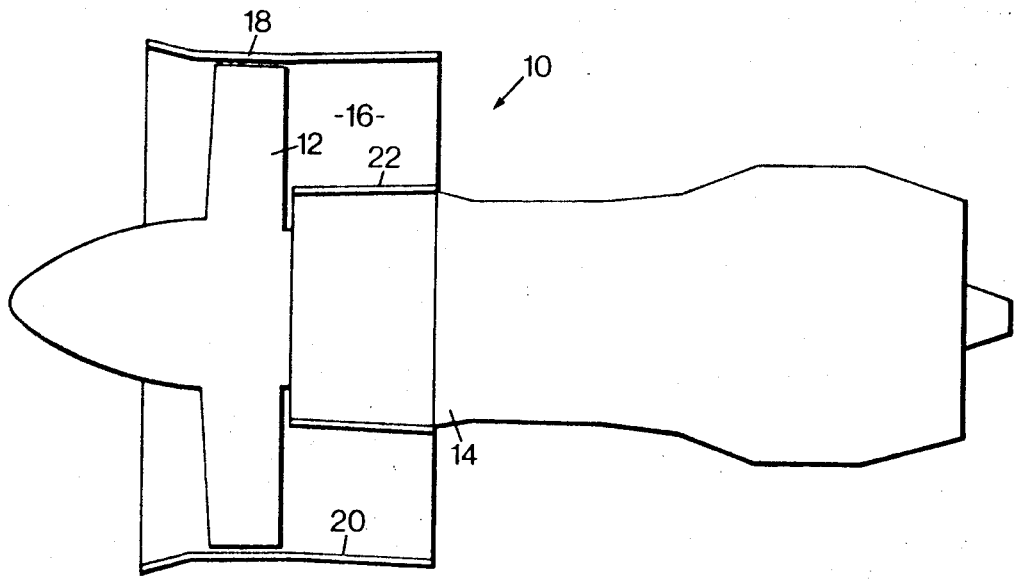

United States Patent
Kitching et al.

[15] 3,640,357
[45] Feb. 8, 1972

[54] ACOUSTIC LININGS

[72] Inventors: Anthony George Kitching, Derby; Mervyn Brown, Ticknall, both of England

[73] Assignee: Rolls Royce Limited, Derby, England

[22] Filed: Feb. 26, 1971

[21] Appl. No.: 119,308

[52] U.S. Cl. ..........................................181/33 G, 181/33 H
[51] Int. Cl. ...................B64d 33/06, E04b 1/84, F01n 1/10
[58] Field of Search..............181/33 R, 33 G, 33 GA, 33 HA, 181/33 HB, 33 HC, 33 HD, 42, 50

[56] References Cited

UNITED STATES PATENTS

| 2,870,857 | 1/1959 | Goldstein | 181/33 G |
| 3,113,634 | 12/1963 | Watters | 181/33 G |
| 3,166,149 | 1/1965 | Hulse et al. | 181/33 R |
| 3,502,171 | 3/1970 | Cowan | 181/33 R |
| 3,507,355 | 4/1970 | Lawson | 181/33 G |

Primary Examiner—Robert S. Ward, Jr.
Attorney—Cushman, Darby & Cushman

[57] ABSTRACT

The invention provides an acoustic lining, suitable for a gas turbine engine, the lining comprising an impervious sheet, a channel layer, a first porous sheet, a honeycomb layer and a second porous sheet, the channel layer being secured to the impervious sheet and the first porous sheet and the honeycomb layer being secured between the first and second porous sheets.

7 Claims, 2 Drawing Figures

PATENTED FEB 8 1972  3,640,357

INVENTORS
ANTHONY GEORGE KITCHING
MERVYN BROWN

BY Cushman, Darby & Cushman
ATTORNEYS

ACOUSTIC LININGS

This invention relates to acoustic linings for attenuating the noise produced by engines such as gas turbine engines. The linings may for example be used to line the bypass duct of a fan engine or the turbine exhaust and intake of such an engine.

The present invention provides an acoustic lining comprising an impervious sheet, a channel layer, a first porous sheet, a honeycomb layer and a second porous sheet, the channel layer being secured to the impervious sheet and the first porous sheet and the honeycomb layer being secured between the first and second porous sheets. The second porous sheet may comprise a single discretely perforated metal sheet or a combination of such a metal sheet and a porous fibrous layer.

The maximum width of each channel in the channel layer may be approximately equal to the width across each cell of the honeycomb layer and the channels may be interconnected by means of slots in the walls of adjacent channels or by forming some of the walls so that they are porous.

The impervious sheet, the first and second porous sheets and the honeycomb layer may be metallic and the channel layer may be made from glass reinforced sheet.

The perforations in the first porous sheet may be larger than the perforations in the second porous sheet and the outer surface of the second porous sheet may be provided with an erosion resistant coating.

The layers and the sheets may be secured together by resin bonding and the honeycomb layer may be secured to the first and second porous sheets by the method described in our copending British application No. 30259/69.

The lining may be formed into a shape suitable for mounting in a gas turbine engine for example it may be annular in cross section for mounting in the bypass duct of a front fan engine or for surrounding the compressor of such an engine.

Figure 2:
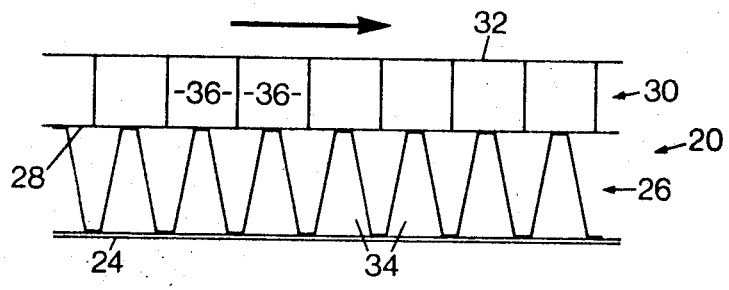

The present invention will now be more particularly described with reference to the accompanying drawing in which FIG. 1 shows a gas turbine engine incorporating one form of acoustic lining according to the present invention and FIG. 2 is an enlarged view of a section of the acoustic lining shown in FIG. 1.

Referring to the Figures, a gas turbine engine 10 is of the front fan type having a fan 12 and compressor means 14 and the fan is mounted for rotation in a duct 16 which is defined by a casing 18. An acoustic lining 20 is mounted in the duct 16 and a further lining 22 surrounds the compressor means 14.

Referring more particularly to FIG. 2, the lining 20 comprises an impervious metallic layer 24, a channel layer 26 and a porous metal layer 28, a honeycomb layer 30 and a second porous metal sheet 32. The channel layer 26 is secured to the sheet 24 and the porous sheet 28 by resin bonding and the honeycomb layer 30 is secured to the first and second porous sheets 28 and 32 by the method described in our copending British application No. 30259/69.

The layer 26 is formed from a glass reinforced plastics sheet which is formed into a corrugated shape to provide a plurality of channels 34 and the maximum width across each channel is approximately equal to the width across each cell 36 of the honeycomb layer 30.

The second porous sheet 32 forms the innermost part of the duct 16 and the channels 34 are arranged to run circumferentially around the duct.

The walls defining the channels 34 can be slotted or made porous both to improve noise attenuation and for ease of manufacture, i.e., since the channels run circumferentially around the duct 16, the channel layer 24 can be made by forming the layer in a flat corrugated shape cutting slits at fairly closely spaced intervals and then bending the flat corrugated shape into an annulus.

This form of construction allows any moisture which may collect in either the channel layer 24 or the honeycomb layer 30 to be easily drained.

In an alternative arrangement (not shown), the sheet 32 can comprise an outer metal sheet formed with discrete perforations bonded to an inner porous fibrous layer, the combination then being bonded to the honeycomb layer 30.

While the impervious sheet 24, the perforate sheets 28 and 32 and the honeycomb 30 have been described as being made of metal they can for example be made of glass fiber reinforced sheets if the environment in which the lining has to operate allows.

The invention has been described in relation to the bypass duct lining and a compressor casing of a jet engine it can equally well be applied to any other part of a gas turbine engine where noise attenuation is required and its use is not restricted to gas turbine engines, e.g., any duct in which a gas is flowing or for enclosing a space in which noise is generated.

We claim:
1. An acoustic lining comprising an impervious sheet, a channel layer, a first porous sheet, a honeycomb layer and a second porous sheet, the channel layer being secured to the impervious layer and the first porous sheet and the honeycomb layer being secured between the first and second porous sheets.

2. An acoustic lining as claimed in claim 1 in which the first porous sheet has perforations which are larger in size than corresponding perforations in the second porous sheet.

3. An acoustic lining as claimed in claim 2 in which the maximum width of each channel is approximately equal to the width across each cell of the honeycomb layer.

4. An acoustic lining as claimed in claim 1 in which the channels of the channel layer are interconnected.

5. An acoustic lining as claimed in claim 4 in which the channels are interconnected by means of slots formed in the walls of adjacent channels.

6. An acoustic lining as claimed in claim 4 in which the channels are interconnected by forming the walls of the channels so that they are porous.

7. An acoustic lining as claimed in claim 1 in which the first and second porous sheets are metallic and the channel layer is formed from a glass fiber reinforced composite sheet.

* * * * *